United States Patent
Polanco et al.

(10) Patent No.: US 10,655,733 B2
(45) Date of Patent: May 19, 2020

(54) ELASTOMERIC SEAL HAVING IMPACT PROTECTING PROTRUSIONS

(71) Applicant: SCHAUBLIN SA, Delémont (CH)

(72) Inventors: Moises Polanco, Jura (CH); Chris Wilhelm, Courtavon (FR)

(73) Assignee: Schaublin SA, Delémont (CH)

( * ) Notice: Subject to any disclaimer, the term of this patent is extended or adjusted under 35 U.S.C. 154(b) by 94 days.

(21) Appl. No.: 15/812,576

(22) Filed: Nov. 14, 2017

(65) Prior Publication Data

US 2018/0142786 A1    May 24, 2018

Related U.S. Application Data

(60) Provisional application No. 62/423,971, filed on Nov. 18, 2016.

(51) Int. Cl.
*F16J 15/02*    (2006.01)
*F16J 3/04*    (2006.01)
(Continued)

(52) U.S. Cl.
CPC .......... *F16J 15/022* (2013.01); *F16C 23/045* (2013.01); *F16C 33/201* (2013.01); *F16C 33/74* (2013.01);
(Continued)

(58) Field of Classification Search
CPC .. F16J 15/022; F16J 3/042; F16J 3/043; F16J 15/52; F16J 15/3224; F16C 11/06
See application file for complete search history.

(56) References Cited

U.S. PATENT DOCUMENTS 2,181,203 A    11/1939    Reynolds
3,260,543 A *    7/1966    Henry-Biabaud ..... B60G 7/005
384/208
(Continued)

FOREIGN PATENT DOCUMENTS

EP    3026286 A2    6/2016
EP    3184832 A1    6/2017
(Continued)

OTHER PUBLICATIONS

EP Communication issued in corresponding EP Application No. 17202274.1, dated Apr. 16, 2018, pp. 1-6.
(Continued)

*Primary Examiner* — Eugene G Byrd
(74) *Attorney, Agent, or Firm* — Murtha Cullina LLP (57) ABSTRACT

An impact resistant seal includes an annular body extending between a first end and a second end. The annular body includes a first anchor formed on the first end and a second anchor formed on the second end. The impact resistant seal includes an elastomeric section having an exterior surface which extends between the first anchor and the second anchor. The elastomeric section is expandable and contractible in response to movement of the first anchor relative to the second anchor. The impact resistant seal includes a plurality of protrusions extending radially outward from the exterior surface and extending circumferentially around the elastomeric section. Adjacent ones of the plurality of protrusions are spaced apart from one another by a predetermined spacing magnitude configured to accommodate the movement of the first anchor relative to the second anchor.

11 Claims, 6 Drawing Sheets

(51) Int. Cl.
  *F16J 15/52* (2006.01)
  *F16J 15/3224* (2016.01)
  *F16C 33/74* (2006.01)
  *F16C 23/04* (2006.01)
  *F16C 33/20* (2006.01)
  *F16C 11/06* (2006.01)

(52) U.S. Cl.
  CPC .............. *F16J 3/042* (2013.01); *F16J 3/043* (2013.01); *F16J 15/3224* (2013.01); *F16J 15/52* (2013.01); *F16C 11/0614* (2013.01); *F16C 11/0676* (2013.01); *F16C 2208/32* (2013.01); *F16C 2326/20* (2013.01)

(56) References Cited

U.S. PATENT DOCUMENTS

| | | | | |
|---|---|---|---|---|
| 3,282,602 | A * | 11/1966 | Willingshofer | B60G 7/005 280/124.134 |
| 3,350,121 | A * | 10/1967 | Townsend | B60G 7/005 403/131 |
| 3,361,458 | A * | 1/1968 | Herbenar | F16C 11/06 384/266 |
| 3,375,028 | A * | 3/1968 | De Patton | F16C 11/06 403/126 |
| 3,391,952 | A * | 7/1968 | Zeigler | F16C 11/06 403/126 |
| 3,698,192 | A * | 10/1972 | Le Febvre, Jr. | F02K 9/84 239/265.35 |
| 3,700,297 | A | 10/1972 | Fickenwirth et al. | |
| 4,059,361 | A * | 11/1977 | Allison | B23P 11/00 403/135 |
| 4,080,103 | A | 3/1978 | Koch | |
| 6,406,025 | B1 * | 6/2002 | Westhoff | E03F 5/021 277/314 |
| 6,644,671 | B1 | 11/2003 | Maughan et al. | |
| 8,783,953 | B2 | 7/2014 | Voisine et al. | |
| 9,562,567 | B2 | 2/2017 | Voisine | |
| 2001/0006153 | A1 | 7/2001 | Merrell et al. | |
| 2004/0026194 | A1 | 2/2004 | Cortinovis | |
| 2004/0232630 | A1 * | 11/2004 | Gasper | F16D 3/845 277/635 |
| 2007/0166096 | A1 * | 7/2007 | Lim | F16C 11/0671 403/50 |
| 2007/0231060 | A1 | 10/2007 | Abels | |
| 2008/0088094 | A1 | 4/2008 | Borowski et al. | |
| 2011/0159971 | A1 * | 6/2011 | Deisinger | F16J 3/042 464/175 |
| 2013/0187345 | A1 * | 7/2013 | Beagen, Jr. | F16L 21/065 277/626 |
| 2014/0110906 | A1 * | 4/2014 | Champion | F16D 55/2265 277/634 |
| 2014/0374994 | A1 * | 12/2014 | Monteil | F16L 17/035 277/314 |
| 2015/0226256 | A1 * | 8/2015 | Voisine | F16C 33/74 384/147 |
| 2016/0186827 | A1 * | 6/2016 | Jungmann | F16D 65/18 188/71.9 |
| 2017/0074111 | A1 * | 3/2017 | Fitzpatrick | F01D 11/005 |
| 2017/0081937 | A1 * | 3/2017 | Turley | E21B 33/00 |
| 2017/0211705 | A1 | 7/2017 | Kobayashi | |
| 2017/0248505 | A1 | 8/2017 | Holmes et al. | |
| 2018/0274584 | A1 * | 9/2018 | Sato | F16C 11/0671 |

FOREIGN PATENT DOCUMENTS

| | | | | |
|---|---|---|---|---|
| JP | 56013252 | A * | 2/1981 | ............... F16J 15/52 |
| JP | 2011163353 | A * | 8/2011 | ............... F16J 3/043 |
| WO | 2009112716 | A2 | 9/2009 | |
| WO | 2010/020223 | A1 | 2/2010 | |
| WO | 2013/013005 | A1 | 1/2013 | |
| WO | 2016/190385 | A1 | 12/2016 | |

OTHER PUBLICATIONS

EP Communication issued in corresponding EP Application No. 17202274.1, dated Feb. 18, 2019, pp. 1-5.

* cited by examiner

ELASTOMERIC SEAL HAVING IMPACT PROTECTING PROTRUSIONS

CROSS REFERENCE TO RELATED APPLICATION

The instant application is a non-provisional of, and claims priority benefit to, U.S. Provisional Patent Application No. 62/423,971, entitled "Elastomeric Seal Having Impact Protecting Protrusions," filed on Nov. 18, 2016, the entirety of which is incorporated by reference herein.

TECHNICAL FIELD

This invention relates to an elastomeric seal having impact protecting protrusions thereon and in particular to an elastomeric seal having a plurality of circumferential ribs extending outwardly from the seal body to provide protection from impact of projectiles such as rocks, dirt, gravel and sticks incurred when employing such seals in bearings and rotating parts in rough terrain vehicles.

BACKGROUND

Seals are generally employed to prevent ingress of contamination and debris into spaces between moving parts of various machines and vehicles (e.g., rough terrain vehicles, mining vehicles, military vanishes and heavy haul vehicles). For example, seals are employed to prevent the ingress of debris into a space between an inner member and an outer member of a bearing in which the inner member and/or outer member rotate and/or misalign relative to one another. One type of bearing is a spherical plain bearing that typically includes a ball positioned for rotational movement in an outer race. The ball defines an outer surface, and the outer race defines an inner surface contoured to receive and retain the ball therein such that the outer surface of the ball is in sliding engagement with the inner surface of the outer race. Contamination of the sliding engagement surfaces, namely, the outer surface of the ball and the inner surface of the outer race, is one of the leading causes of bearing damage. Typically, the spherical plain bearing assembly includes a sealing arrangement on opposing sides thereof, wherein a seal has opposing ends disposed in a groove on each of the ball and the outer race. The seal aides in retaining lubrication between the sliding engagement surfaces and for inhibiting the ingress of dirt, water, particulate matter, and other contaminants to the sliding engagement surfaces.

Some of the above mentioned vehicles employ seals manufactured from an elastomeric material that is flexible to accommodate misalignment of the outer member relative to the inner member. However, such elastomeric seals are prone to damage (e.g., piercing, cutting, tearing, and ripping) from interaction with projectiles or sharp objects. Efforts to prevent such damage to the seals include the use of ridged plastic or metallic caps that cover the seal. However, the caps constitute an additional part that takes up space to install in configurations where clearances are rather tight or surfaces for securing the caps to are small. Thus, in some instances there is insufficient clearance or surface area for installation of such caps.

Based on the foregoing, there is a need for protecting seals from damage caused by interaction with projectiles or sharp objects.

SUMMARY

There is disclosed herein an impact resistant seal that includes an annular body extending between a first end and a second end. The annular body includes a first anchor formed on the first end and a second anchor formed on the second end. The impact resistant seal includes an elastomeric section having an exterior surface which extends between the first anchor and the second anchor. The elastomeric section is expandable and contractible in response to movement of the first anchor relative to the second anchor. The impact resistant seal includes a plurality of protrusions extending radially outward from the exterior surface and extending circumferentially around the elastomeric section. Adjacent ones of the plurality of protrusions are spaced apart from one another by a predetermined spacing magnitude configured to accommodate the movement of the first anchor relative to the second anchor.

In one embodiment, the elastomeric section includes a serpentine cross section having a first leg and a bend extending from the first leg. The first leg and the bend include the plurality of protrusions. In one embodiment, each of the plurality of protrusions has a tapered cross section. In one embodiment, the tapered cross section is defined by axial opposing sides spaced apart from each other by an angle of about 5 to 15 degrees.

In one embodiment, each of the plurality of protrusions has a radial outermost end that has an arcuate shaped edge.

In one embodiment, each of the plurality of protrusions has a height extending from the exterior surface that is about 50 to 70 percent of the predetermined spacing magnitude.

In one embodiment, each of the plurality of protrusions has a height extending from the exterior surface. The height is of a predetermined magnitude configured to intercept projectiles from impacting the exterior surface.

In one embodiment, each of the plurality of protrusions has a base portion that is integral with the exterior surface and adjacent ones of the plurality of protrusions are elastically pivotal towards one another to reduce the predetermined spacing magnitude in response to receipt of an external force applied thereto.

In one embodiment, the base portion and the exterior surface intersect at a junction and a line originating from the junction and extending outward from between adjacent pairs of the plurality of protrusions swings an angle between the adjacent pairs of the plurality of protrusions. The angle is of a magnitude sufficient to protect the exterior surface of the seal from impact by projectiles.

In one embodiment, the impact resistant seal has an axial compressive stress that is about equal to that of a comparable seal without the plurality of protrusions.

DETAILED DESCRIPTION

Figure 1:
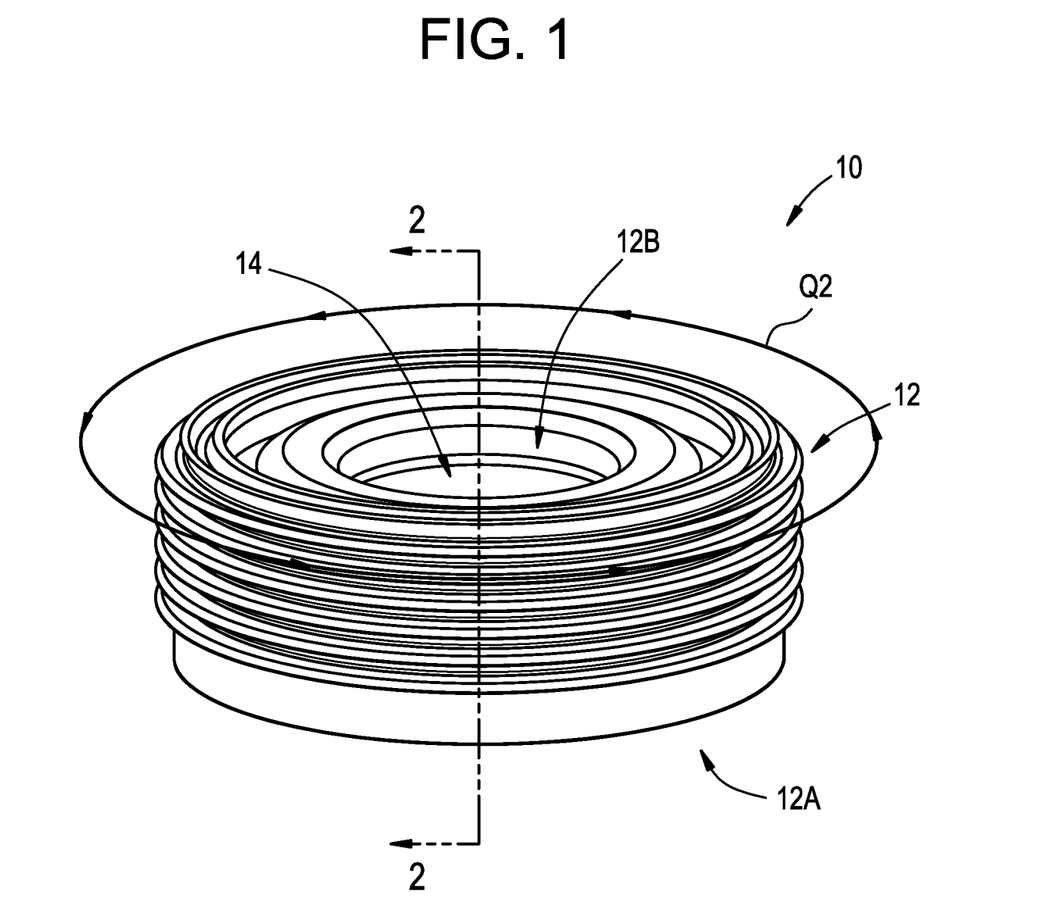
FIG. 1 is a perspective view of a seal of the present invention having circumferential protrusions.
Figure 2:
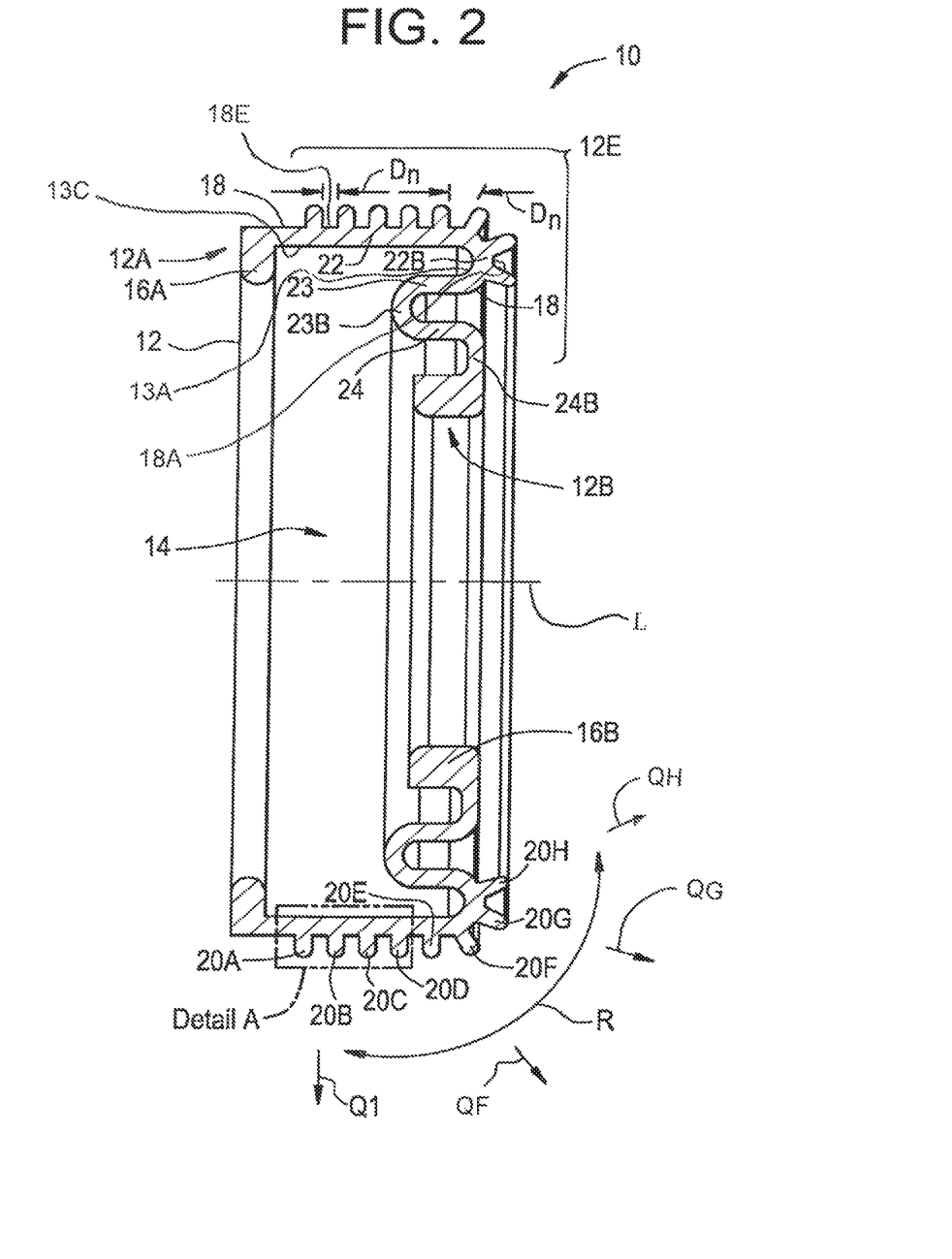
FIG. 2 is a cross sectional view of the seal of FIG. 1 taken across line 2-2.

As shown in FIGS. 1 and 2, an impact resistant seal (herein after "seal" or "impact resistant seal") is generally designated by the numeral 10. The seal 10 includes an annular body 12 with an opening 14 extending therethrough. As shown in FIG. 2, the annular body 12 extends between a first axial end 12A and a second axial end 12B thereof. A first anchor 16A is formed on the first axial end 12A; and a second anchor 16B formed on the second axial end 12B. The seal 10 is manufactured from an elastomeric material such as but not limited to natural rubber, isoprene rubber, butadiene rubber, neoprene, butyl rubber and nitrile rubber.

Figure 5:
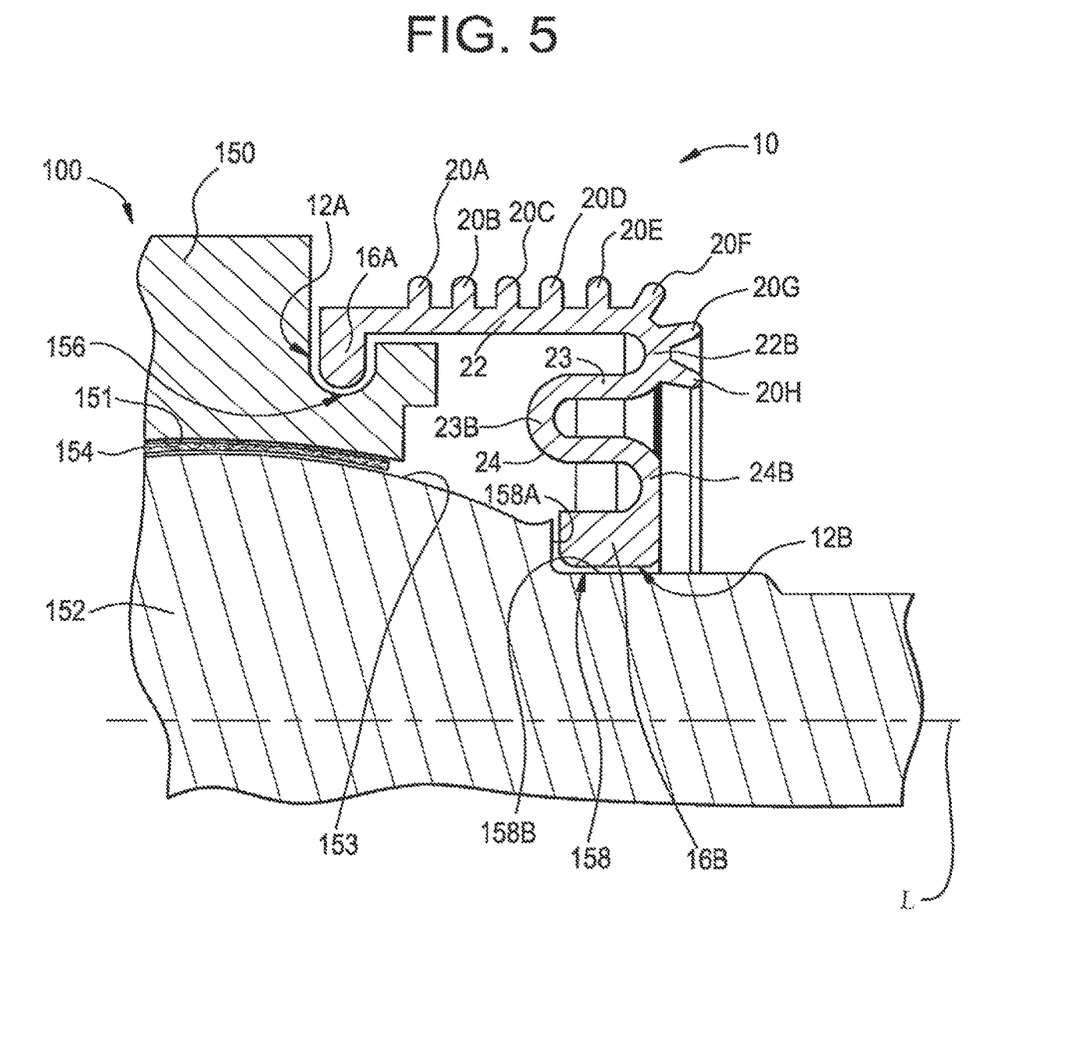
FIG. 5 is a cross section view illustrating the seal of FIG. 1 installed between an inner member and an outer member.

As shown in FIG. 5, the impact resistant seal 10 is shown installed in a spherical bearing 100 that includes an outer member 150 positioned partially around an inner member 152. The outer member 150 has a arcuate (e.g., spherical shaped) inward facing surface 151. The outer member 152 has an arcuate (e.g., spherical) outward facing surface 153 that is shaped complementarily to the inward facing surface 151. A lubricious liner 154 is disposed between the inward facing surface 151 and the outward facing surface 153. In one embodiment, the lubricious liner 154 is adhered to the outward facing surface 153 and slidingly engages the inward facing surface 151. In one embodiment, the lubricious liner 154 is adhered to the inward facing surface 151 and slidingly engages the outward facing surface 153. In one embodiment, the lubricious liner 154 includes polytetrafluoroethylene (PTFE).

As shown in FIG. 5, the first anchor 16A is fixedly seated (e.g., press fit or frictionally fit) into a groove 156 formed in the outer member 150. The second anchor 16B is moveably seated into a groove 158 formed in the inner member 152. The second anchor 16B has an axial surface that slidingly engages a first sealing surface 158A of the groove 158 in the inner member 152 and a radially inner surface that slidingly engages a second sealing surface 158A of the groove 158 of the inner member 152.

Referring back to FIG. 2, the annular body 12 includes an elastomeric section 12E that has an exterior surface 18 that is has a straight portion 18E and an arcuate portion 18A. The elastomeric section 12E extends between the first anchor 16A and the second anchor 16B. The elastomeric section 12E is expandable and contractible in the direction of the arrow R in response to movement of the first anchor 16A relative to the second anchor 16B. A first plurality (e.g., five shown) of protrusions 20A, 20B, 20C, 20D, 20E (e.g., ribs) extend radially outward from the straight exterior surface 18E in the direction of the arrow Q1 (i.e., radial direction) and extend circumferentially around (e.g., continuously around) in the direction of the arrow Q2 (see FIG. 1). A second plurality (e.g., three shown) of protrusions 20F, 20G, 20H (e.g., ribs) extend outwardly from the arcuate exterior surface 18A in the direction of the arrows QF, QG, QH, respectively and extend circumferentially around (e.g., continuously around) in the direction of the arrow Q2. (see FIG. 1). While eight protrusions are shown and described, the present invention is not limited in this regard as any number of protrusions may be employed without departing from the broader aspects of the present invention.

As best shown in FIG. 2, adjacent ones of the plurality of protrusions 20A, 20B, 20C, 20D, 20E, 20F, 20G and 20H are spaced apart from one another by a predetermined spacing magnitude Dn. A predetermined spacing magnitude Dn is configured to accommodate (e.g. enable or allow for) the movement of the first anchor 16A relative to the second anchor 16B and to accommodate (e.g. enable or allow for) extension and contraction elastomeric section 12E is expandable and contractible in the direction of the arrow R. As shown in FIG. 2, the elastomeric section 12E has a serpentine cross section having a first leg 22 (i.e., a straight leg) and a first bend 22B (e.g., a 180 degree arcuate bend) extending from the first leg 22. The plurality of protrusions 20A, 20B, 20C, 20D and 20E extend from the first leg 22 and the plurality of protrusions 20F, 20G and 20H extend from the first bend 22B. The elastomeric section 12E includes a second leg 23 extending from the first bend 22B, wherein the second leg 23 is substantially parallel to the first leg 22 in a relaxed state of the seal 10. A second bend 23B (e.g., a 180 degree arcuate bend) extends from the second leg 23 and terminates in a third leg 24. The third leg 24 is substantially parallel to the second leg 23 in a relaxed state of the seal 10. A third bend 24B (e.g., a 180 degree arcuate bend) extends from the third leg 24 and terminates at the second anchor 16B. As shown in FIGS. 2 and 5, the annular body 12 has a longitudinal axis L extending axially therethrough. The first leg 22 has a cylindrical inner surface 13C and a cylindrical exterior surface 18E (e.g., a straight surface) that are each coaxial with the longitudinal axis L. The first bend 22B extends radially inward from the first leg 22. The first bend 22B has an arcuate inner surface 13A and an arcuate exterior surface 18A. The first plurality of protrusions 20A, 20B, 20C, 20D, 20E extend outwardly from the cylindrical exterior surface 18E in a radially outward direction Q1 and extend circumferentially around the elastomeric section 12E. A second plurality of protrusions 20F, 20G, 20H extend outwardly from the arcuate exterior surface at directions QF, QG, QH different from one another and different from the radial direction Ql.

Figure 3A:
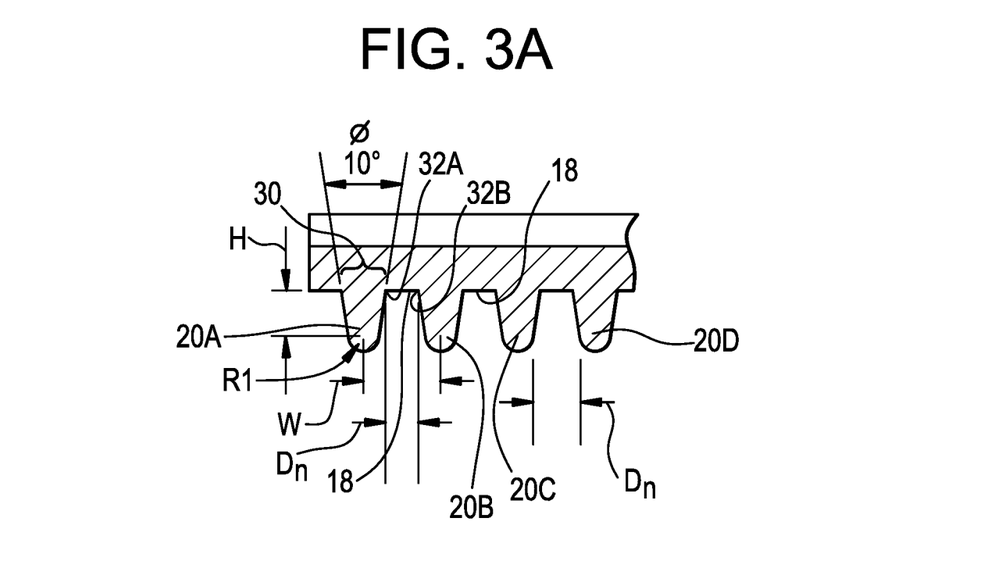
FIG. 3A is an enlarged view of detail 3 of the seal of FIG. 2.

As best shown in FIG. 3A, each of the protrusions 20A, 20B, 20C and 20D has a tapered cross section. While FIG. 3A shows protrusions 20A, 20B, 20C and 20D with the tapered cross section, the protrusions 20E, 20F, 20G and 20H also have a tapered cross section. In one embodiment, the tapered cross section is defined by axial opposing sides spaced apart from each other by an angle Ø of about 10 degrees. Each of the plurality of protrusions 20A, 20B, 20C, 20D, 20E, 20F, 20G and 20H has a radial outermost end that has an arcuate shaped edge with a predetermined radius R1. While the angle Ø is shown and described as being about 10 degrees, the present invention is not limited in this regard as other magnitudes of the angle Ø may be employed, including, but not limited to 0 to 5 degrees, 0 to 10 degrees, 5 to 10 degrees, 10 to 15 degrees, 10 to 20 degrees and 10 to 25 degrees, depending on the function of the impact resistant seal 10 and the type of protection desired.

As shown in FIG. 3A, each of the plurality of protrusions 20A, 20B, 20C and 20D has a height H extending from the exterior surface 18 that is about 60 percent of a predetermined peak-to-peak spacing magnitude W. While FIG. 3A shows protrusions 20A, 20B, 20C and 20D with the height H that is about 60 percent of the predetermined peak-to-peak spacing magnitude W, the protrusions 20E, 20F, 20G and 20H also have the height H that is about 60 percent of the predetermined peak-to-peak spacing magnitude W. While the protrusions 20A, 20B, 20C, 20D 20E, 20F, 20G and 20H are described as having the height H extending from the exterior surface 18 that is about 60 percent of a predetermined peak-to-peak spacing magnitude W, the present invention is not limited in this regard as other heights H and predetermined peak-to-peak spacing magnitudes W may be employed, including, but not limited to the height H extending from the exterior surface 18 that is about 50 to 70 percent, 50 to 60 percent, 60 to 70 percent or 40 to 80 percent, of the predetermined peak-to-peak spacing magnitude W.

Figure 3B:
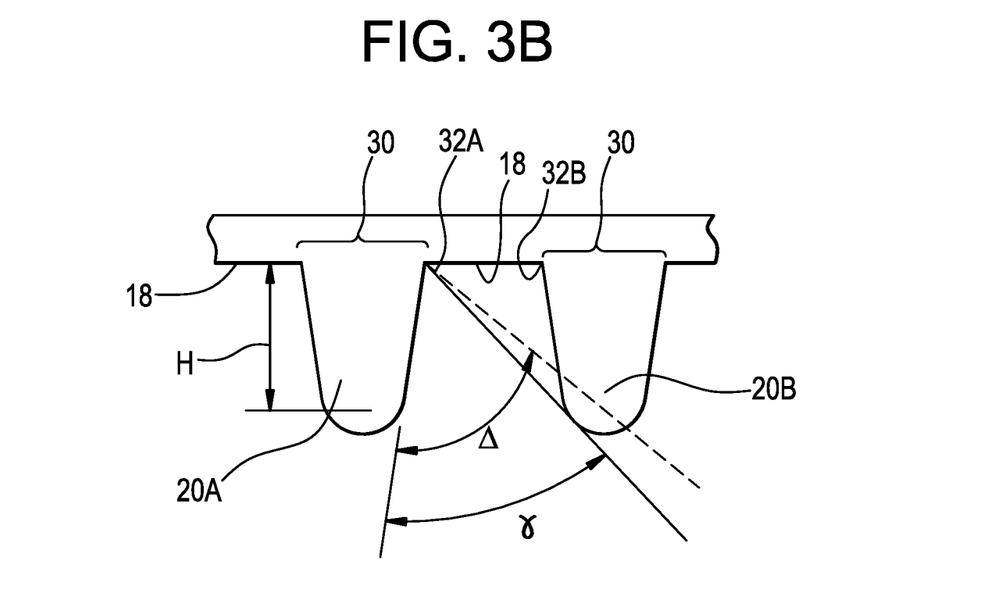
FIG. 3B is a further enlarged view of a portion of the seal of FIG. 3A.

In one embodiment, as shown in FIG. 3B, the height H extends from the exterior surface 18, a magnitude configured to intercept projectiles from impacting the exterior surface 18. For example, as shown in FIG. 3B, each of the protrusions 20A and 20B has a base portion 30 that intersects the exterior surface 18 intersect at a junction 32A, 32B and a line originating from the junction 32A and extending outward from between adjacent protrusions 20A and 2B swings a predetermined angle γ between the protrusions 20A and 20B of a magnitude selected based upon the configuration of the mounting (e.g., position, angle and exposure to the environment) of the spherical bearing 100 and the impact resistant seal 10 in a vehicle. Thus projectiles approaching the seal 10, having an angle Δ that is greater than the angle γ, will be intercepted by one of the protrusions 20A or 20B. In one embodiment, the protrusions 20C, 20D, 20E, 20F, 20G and 20H, are configured similar to that of the protrusions 20A and 20B illustrated in FIG. 3B.

In one embodiment, each of the plurality of protrusions 20A, 20B, 20C, 20D, 20E, 20F, 20G and 20H, the base portion 30 is integral with the exterior surface 18 and adjacent ones of the plurality of protrusions 20A, 20B, 20C, 20D, 20E, 20F, 20G and 20H are elastically pivotal towards one another to reduce the predetermined peak-to-peak spacing magnitude W in response to receipt of an external force applied thereto.

In one embodiment, the seal 10 has an axial compressive stress that is about the same as a comparable seal (e.g., the seal 10 but having a smooth exterior surface 18) without the plurality of protrusions 20A, 20B, 20C, 20D, 20E, 20F, 20G and 20H. In one embodiment, the number protrusions 20A, 20B, 20C, 20D, 20E, 20F, 20G and 20H are determined to establish a predetermined stiffness of the impact resistant seal 10. In one embodiment, the number of the protrusions 20A, 20B, 20C, 20D, 20E, 20F, 20G and 20H is increased to increase the stiffness of the impact resistant seal 10. In one embodiment, the predetermined spacing magnitude Dn and predetermined peak-to-peak spacing magnitudes W are decreased to make the impact resistant seal 10 stiffer. In one embodiment, magnitudes for the height H and the predetermined peak-to-peak spacing magnitudes W are preselected to effect flexibility and stiffness to adjusted to account for the type of contamination and the amount of misalignment of the impact resistant seal 10.

Figure 4:
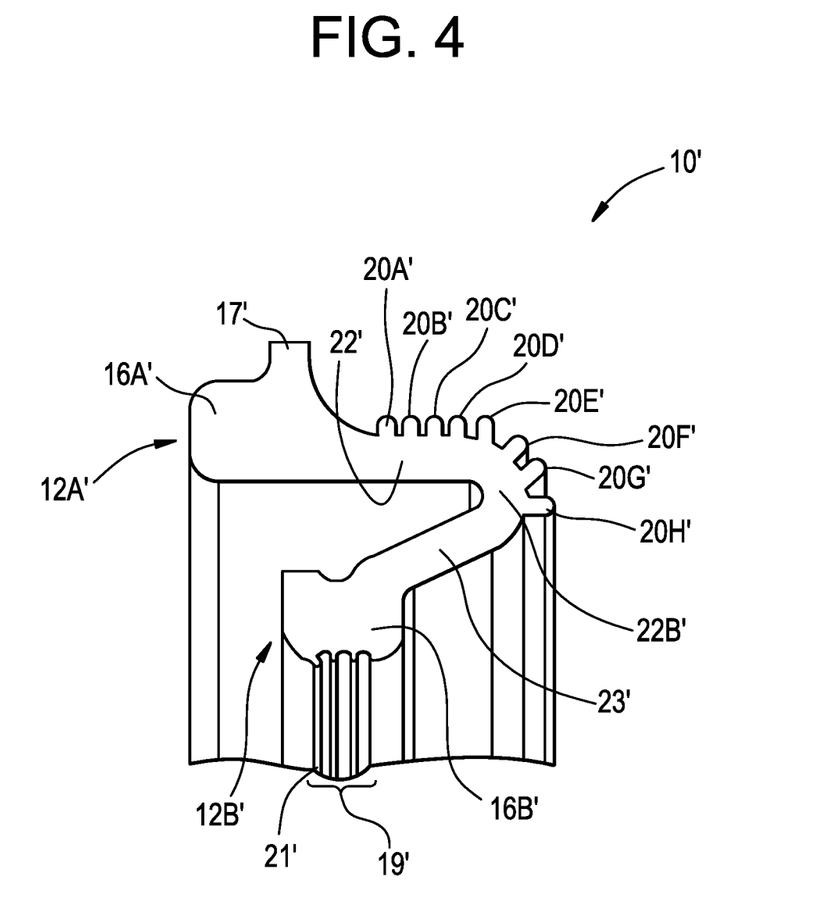
FIG. 4 is an enlarged view of another embodiment of the seal of FIG. 1.

The impact resistant seal 10 that has an operational misalignment of less than ±3° has decreased predetermined peak-to-peak spacing magnitudes W compared to those impact resistant seals 10 having operational misalignments greater than or equal to ±3° which are configured with greater predetermined peak-to-peak spacing magnitudes W. In one embodiment the magnitude of the height H is determined based upon the type of projectile anticipated to impinge the impact resistant seal 10. For example, if the projectiles are tree branches or other long and thin objects, then the height H is increased to protect the exterior surface 18; and if the projectiles are rocks and mud, the height H can be decreased. The seal 10' illustrated in FIG. 4 is similar to the seal 10 of FIGS. 1 and 2, thus similar elements are designated with similar element numbers with a prime designation. The first anchor 16A' of the seal 10' differs from the anchor 16A of the seal 10 in that the anchor 16A' includes a radially outward projection lip 17' for securing the seal 10' into an outer member (not shown). In addition, the second anchor 16B' differs from the second anchor 16B of the seal 10 in that the second anchor 16B' includes a plurality of ribs 19' on a radially inward portion of the second anchor 16B' to promote sealing with an inner member 152 as shown in FIG. 5. The ribs 19' provide a reservoir for a lubricant 21 (e.g., grease). The ribs 19' and lubricant 21 reduces sliding friction between the second end 12B' of the seal 10' and an exterior surface of the inner member 152 rotating relative to the outer member 150. The ribs 19' and the lubricant 21 have particular utility in bearings in which the inner member 152 rotates at high speeds relative to the seal 10' and the outer member 150, for example to prevent sticking of the second end 12B' of the seal 10' to the inner member 152. In one embodiment, the seal 10' is manufactured from an elastomeric material such as but not limited to natural rubber, isoprene rubber, butadiene rubber, neoprene, butyl rubber and nitrile rubber. The grease 21 helps prevent wear of the second end 12B' of the seal 10'.

While the plurality of protrusions 20A, 20B, 20C, 20D, 20E, 20F, 20G and 20H shown and described herein with respect to FIGS. 1 and 2 are described has having a tapered cross section, the height H, the predetermined spacing magnitude W and the height H that is about 60 percent of the predetermined spacing magnitude W, the present invention is not limited in this regard as other configurations of the protrusions may be employed including, but not limited to those shown in FIGS. 6-9.

Figure 6:
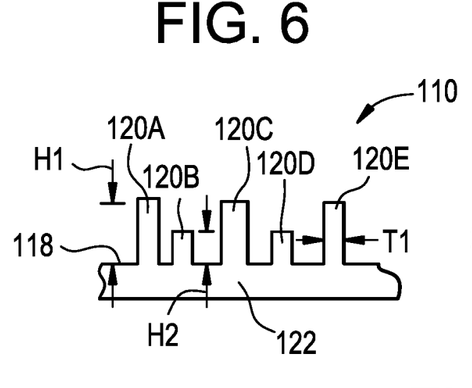
FIG. 6 is an enlarged cross sectional view of another embodiment of the seal of FIG. 1.

As shown in FIG. 6, the seal 110 includes protrusions 120A, 120C and 120E having a first height H1 and protrusions 120B and 120D have a second height of H2, wherein the height H2 is less than the height H1. In addition, the protrusions 120A, 120B, 120C, 120D and 120 E have a uniform (i.e., not tapered) cross section having a uniform thickness T1.

Figure 7:
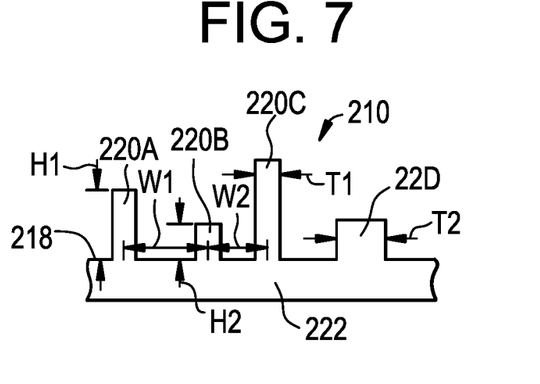
FIG. 7 is an enlarged cross sectional view of another embodiment of the seal of FIG. 1.

As shown in FIG. 7, the seal 210 includes protrusions 220A, 220B, 220C and 220D of different heights H1, H2 (e.g., H1 is greater than H2), different spacings W1, W2 (e.g., W1 is greater than W2) and different thicknesses T1 and T2 (e.g., T2 is greater than T1).

Figure 8:
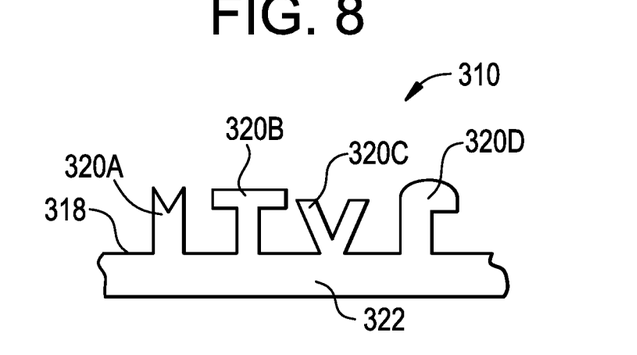
FIG. 8 is an enlarged cross sectional view of another embodiment of the seal of FIG. 1.

As shown in FIG. 8, the seal 310 includes protrusions 320A, 320B, 320C and 320D having different end configurations. For example, the protrusion 320A has a V-shaped end, the protrusion 320B has a T-shaped end, the protrusion 320C has a V-shaped split and the protrusion 320D has an L-shaped cross section.

Figure 9:
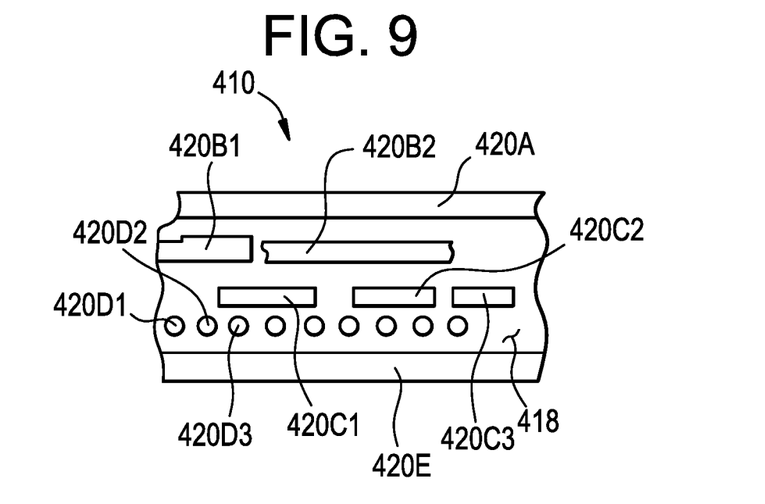
FIG. 9 is top view of another embodiment of the seal of FIG. 1.

While FIG. 1 shows the plurality of protrusions 20A, 20B, 20C, 20D, 20E, 20F, 20G and 20H extending circumferentially (e.g., continuously around) around in the direction of the arrow Q2 (see FIG. 1), the present invention is not limited in this regard as other configurations of the protrusions may be employed such as those shown in FIG. 9. As shown in FIG. 9, the protrusions 420A and 420E extend continuously circumferentially around the seal 410. The protrusions 420B1 and 420B2 are elongate protrusions that are circumferentially spaced apart from one another. The protrusions 420C1, 420C2 and 420C3 are elongate protrusions that are circumferentially spaced apart from one another. The protrusions 420D1, 420D2, 420D3 are discrete rod like protrusions that are spaced apart from one another and aligned in a circumferential line around the seal 410.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of the appended claims.

What is claimed is:

1. An impact resistant seal comprising;
an annular body extending between a first axial end and a second axial end, the annular body having a longitudinal axis extending axially therethrough;
a first anchor formed on the first axial end;
a second anchor formed on the second axial end;
an elastomeric section having a straight leg extending from the first anchor, the straight leg comprising a cylindrical inner surface and a cylindrical exterior surface that are each coaxial with the longitudinal axis, a first bend extending radially inward from the straight leg, the first bend having an arcuate inner surface and an arcuate exterior surface, the elastomeric section extending between the first anchor and the second anchor, the elastomeric section being expandable and contractible in response to movement of the first anchor relative to the second anchor;
a first plurality of protrusions extending outwardly from the cylindrical exterior surface in a radially outward direction and extending circumferentially around the elastomeric section, adjacent ones of the first plurality of protrusions being spaced apart from one another by a predetermined spacing magnitude configured to accommodate the movement of the first anchor relative to the second anchor; and
a second plurality of protrusions extending outwardly from the arcuate exterior surface at directions different from one another and different from the radial direction, the second plurality of protrusions extending circumferentially around the elastomeric section, adjacent ones of the second plurality of protrusions being spaced apart from one another by a predetermined spacing magnitude configured to accommodate the movement of the first anchor relative to the second anchor.

2. The impact resistant seal of claim 1, wherein each of the first plurality of protrusions and the second plurality of protrusions has a tapered cross section.

3. The impact resistant seal of claim 2, wherein the tapered cross section is defined by axial opposing sides spaced apart from each other by an angle of about 5 to 15 degrees.

4. The impact resistant seal of claim 1, wherein each of the first plurality of protrusions and the second plurality of protrusions has a radial outermost end that has an arcuate shaped edge.

5. The impact resistant seal of claim 1, wherein each of the first plurality of protrusions and the second plurality of protrusions has a height extending from the exterior surface that is about 50 to 70 percent of the predetermined spacing magnitude.

6. The impact resistant seal of claim 1, wherein each of the first plurality of protrusions and second plurality of protrusions has a base portion that is integral with the exterior surface and adjacent ones of the first plurality of protrusions and the second plurality of protrusions are elastically pivotal in relation to one another to reduce the predetermined spacing magnitude in response to receipt of an external force applied thereto.

7. The impact resistant seal of claim 1, wherein the base portion and the exterior surface intersect at a junction and a line originating from the junction and extending outward from adjacent pairs of the first plurality of protrusions and the second plurality of protrusions swings an angle between the adjacent pairs of the first plurality of protrusions and the second plurality of protrusions, the angle being of a magnitude sufficient to protect the exterior surface of the seal from impact by projectiles.

8. The impact resistant seal of claim 1, wherein the first plurality of protrusions and the second plurality of protrusions establish a predetermined stiffness of the seal.

9. The impact resistant seal of claim 1, wherein at least one of the first plurality of protrusions and the second plurality of protrusions extends continuously around the exterior surface of the elastomeric section.

10. The impact resistant seal of claim 1, wherein each of the first plurality of protrusions and the second plurality of protrusions is positioned to intercept projectiles.

11. The impact resistant seal of claim 1, wherein the predetermined spacing magnitude is configured to control a stiffness of the seal.

* * * * *